US011377998B1

(12) United States Patent
Burcar

(10) Patent No.: US 11,377,998 B1
(45) Date of Patent: Jul. 5, 2022

(54) FAN ADAPTER FOR AN ENGINE

(71) Applicant: Caterpillar Inc., Peoria, IL (US)

(72) Inventor: Quinton Burcar, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/122,411

(22) Filed: Dec. 15, 2020

(51) Int. Cl.
| *F01P 7/04* | (2006.01) |
| *F01P 5/02* | (2006.01) |
| *F01P 5/04* | (2006.01) |
| *F04D 29/26* | (2006.01) |
| *F01P 11/00* | (2006.01) |

(52) U.S. Cl.
CPC .............. *F01P 5/04* (2013.01); *F01P 11/00* (2013.01); *F04D 29/263* (2013.01)

(58) Field of Classification Search
CPC . F01P 7/046; F01P 5/02; F16D 25/123; F16D 2300/0212; H02K 9/06
See application file for complete search history.

(56) References Cited

U.S. PATENT DOCUMENTS

| 3,824,807 | A | | 7/1974 | Hecht | |
| 4,180,024 | A | * | 12/1979 | Hernandez | F01P 5/02 123/41.46 |
| 5,667,045 | A | * | 9/1997 | Cummings, III | F16D 43/284 192/82 T |
| 5,938,405 | A | | 8/1999 | Coleman | |
| 7,104,382 | B2 | * | 9/2006 | Swanson | F16D 25/0638 192/85.37 |
| 10,590,948 | B2 | | 3/2020 | Simofi-Ilyes et al. | |
| 2006/0070588 | A1 | * | 4/2006 | Bowman | F16H 9/18 123/41.12 |
| 2008/0295786 | A1 | * | 12/2008 | Nelson | F01P 5/04 123/41.12 |
| 2014/0102432 | A1 | * | 4/2014 | Edwards | B28D 1/04 125/13.01 |
| 2014/0271285 | A1 | * | 9/2014 | McDougall | F04D 13/0666 417/423.1 |
| 2015/0204351 | A1 | * | 7/2015 | Watanabe | F01P 5/12 415/213.1 |
| 2015/0211532 | A1 | * | 7/2015 | Whitley | F04D 29/34 29/889.3 |
| 2015/0308334 | A1 | * | 10/2015 | Oedewaldt | F16D 3/68 474/198 |
| 2018/0298913 | A1 | * | 10/2018 | Savage | F04D 29/34 |
| 2019/0376437 | A1 | * | 12/2019 | Sarder | F01P 1/00 |

OTHER PUBLICATIONS

European Search Report for Int'l. Patent Appln. No. 21209436.1-1004, dated May 24, 2022 (7 pgs).

* cited by examiner

*Primary Examiner* — Long T Tran

(74) *Attorney, Agent, or Firm* — Bookoff McAndrews PLLC

(57) ABSTRACT

A fan adapter includes a base and a fan end portion. The base includes a mounting portion and a coupling portion, and the base is configured to be coupled to a portion of an engine. The fan end portion includes a mounting portion and a coupling portion. The coupling portion of the fan end portion is configured to be coupled to the coupling portion of the base, and the fan end portion is removably couplable to the base via one or more coupling elements to prevent relative rotation between the base and the fan end portion.

17 Claims, 4 Drawing Sheets

FAN ADAPTER FOR AN ENGINE

TECHNICAL FIELD

The present disclosure relates generally to a fan adapter for an engine, and more particularly, to a two-piece fan adapter for an engine.

BACKGROUND

Engine-driven machines, for example, such as tractors, wheel loaders, etc., typically utilize one or more fans coupled to, or otherwise in proximity to, the engine to help cool the engine. In some machines, the fan is coupled to the engine, for example, via an adapter coupled to a hub or other portion of the engine, and the fan may be driven by a crankshaft, a dedicated fan drive, an auxiliary shaft, etc. The adapter often includes a base end to be coupled to the hub or other portion of the engine and a fan end, for example, to be coupled to the fan. However, different sizes of engines may require different sizes or types of fans, and/or different spacings between the hub or coupling portion of the engine and the fan. Based on these variances, different sizes of engines and/or different spacings may require different size and/or shape of adapters. Some adapters may include smaller distances between the base end and the fan end, which may increase the difficulty and/or complexity of coupling the adaptor and/or fan to the engine. For example, a smaller distance between the base end and the fan end may increase the difficulty in fitting coupling elements (e.g., bolts, screws, etc.) between the base end and the fan end to couple the adapter to the hub or other portion of the engine.

An exemplary fan adapter is disclosed in U.S. Pat. No. 10,590,948 ("the '948 patent") to Simofi-Ilyes et al. The '948 patent discloses an adapter for attaching a cooling fan to a motor in a cooling fan module for an automotive cooling system. In one embodiment, the adapter of the '948 patent includes first and second parts to form a two-piece fan adapter, but the coupling of the first and second parts relies on a shaft of the driving motor. In this aspect, the first part of the fan adapter is preassembled with a portion of the rotor, which may require specific sizes and/or shapes of both the first and second parts relative to the shaft of the driving motor. Additionally, the coupling of the first and second parts of the fan adapter may not secure the respective orientations of the first and second parts to each other, may be susceptible to shear, and/or may otherwise increase the risk of breakage. While the adapter of the '948 patent may be suitable for some applications, the adapter may not be suitable for other applications. The disclosed fan adapters of the present disclosure may solve one or more of the problems set forth above and/or other problems in the art. The scope of the current disclosure, however, is defined by the attached claims, and not by the ability to solve any specific problem.

SUMMARY

In one aspect, a fan adapter may include a base and a fan end portion. The base may include a mounting portion and a coupling portion, and the base may be configured to be coupled to a portion of an engine. The fan end portion may include a mounting portion and a coupling portion. The coupling portion of the fan end portion may be configured to be coupled to the coupling portion of the base, and the fan end portion may be removably couplable to the base via one or more coupling elements to prevent relative rotation between the base and the fan end portion.

In another aspect, a component for an engine fan adapter may include a fan end portion with a mounting portion and a coupling portion that extends from the mounting portion. The coupling portion may include a mating portion configured to mate with a base portion that is coupled to an engine, and the coupling portion may further include a through-hole in a central portion of the mating portion configured to receive a coupling element to couple the fan end portion to the base portion.

In yet another aspect, a component for an engine fan adapter includes a base portion. The base portion includes a mounting portion configured to be coupled to a fan drive pulley or a fan drive of an engine, and a coupling portion that extends from the mounting portion. The coupling portion includes a mating portion configured to mate with a fan end portion that is coupled to or supports a fan. The coupling portion further includes a hole in a central portion of the mating portion configured to receive a coupling element to couple the fan end portion to the base portion.

DETAILED DESCRIPTION

Both the foregoing general description and the following detailed description are exemplary and explanatory only and are not restrictive of the features, as claimed. As used herein, the terms "comprises," "comprising," "having," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. Moreover, in this disclosure, relative terms, such as, for example, "about," substantially," and "approximately" are used to indicate a possible variation of ±10% in the stated value. Furthermore, the terms "couple," "coupled," "coupled to," etc. are used to indicate that two or more components are physically joined, attached, or connected, either directly or indirectly, via one or more additional components.

Figure 1:
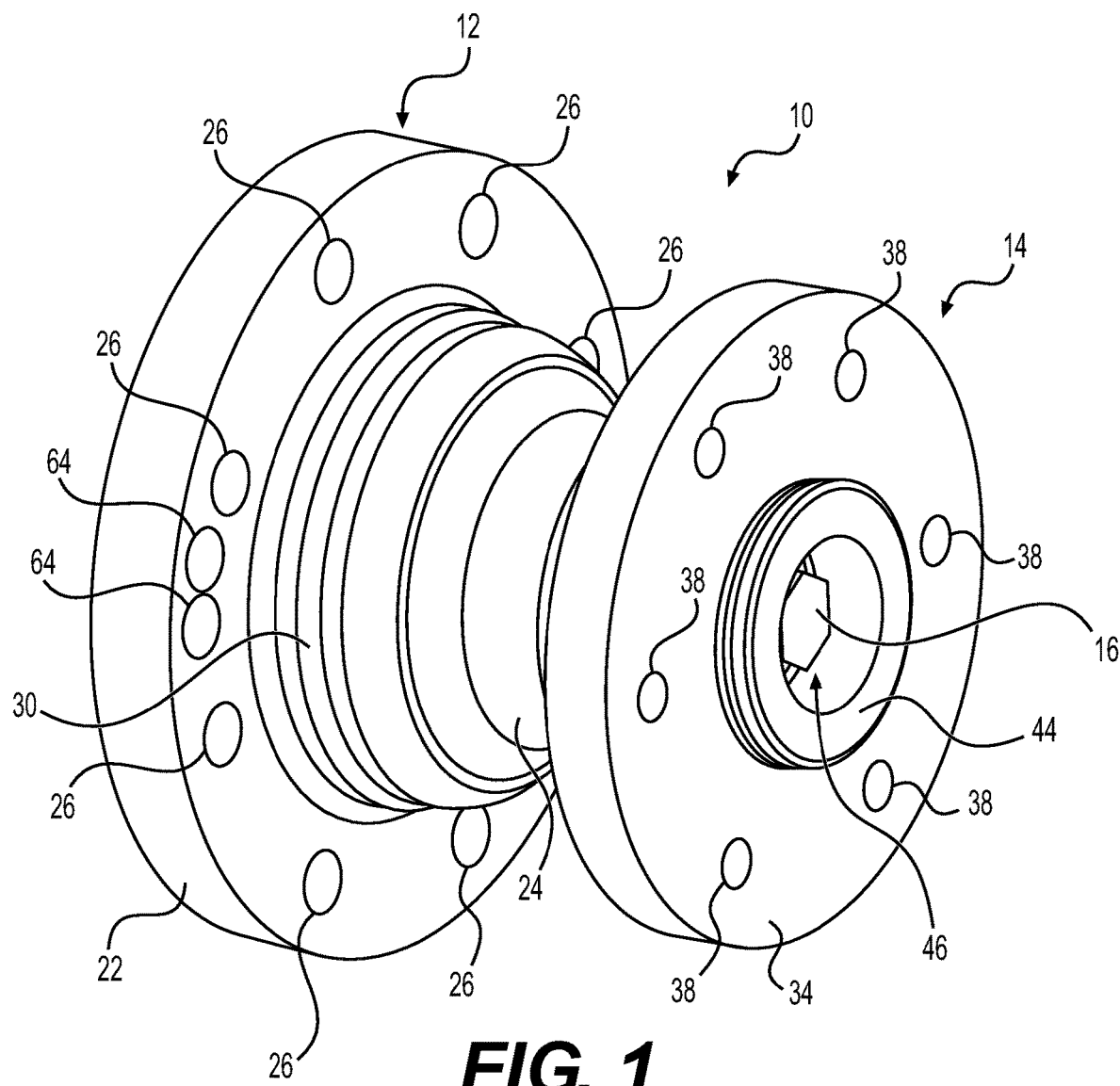
FIG. 1 is a perspective view of an exemplary fan adapter.
Figure 4A:
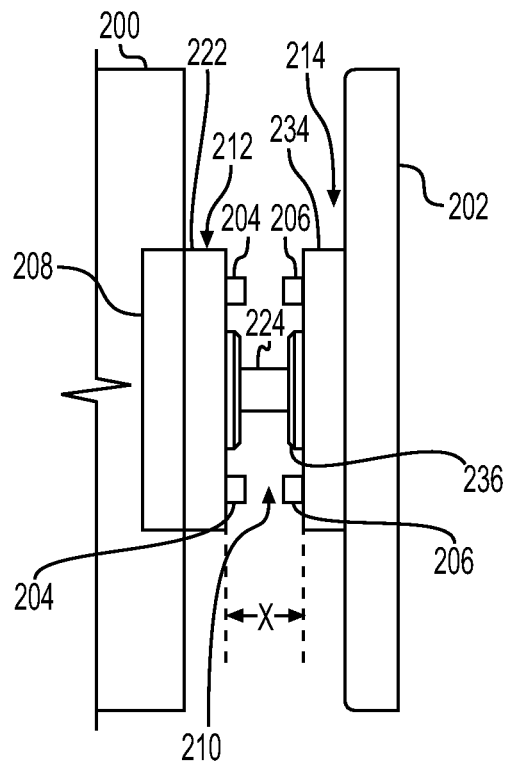
FIG. 4A is a side view of an exemplary fan adapter coupling an engine and a fan.
Figure 4B:
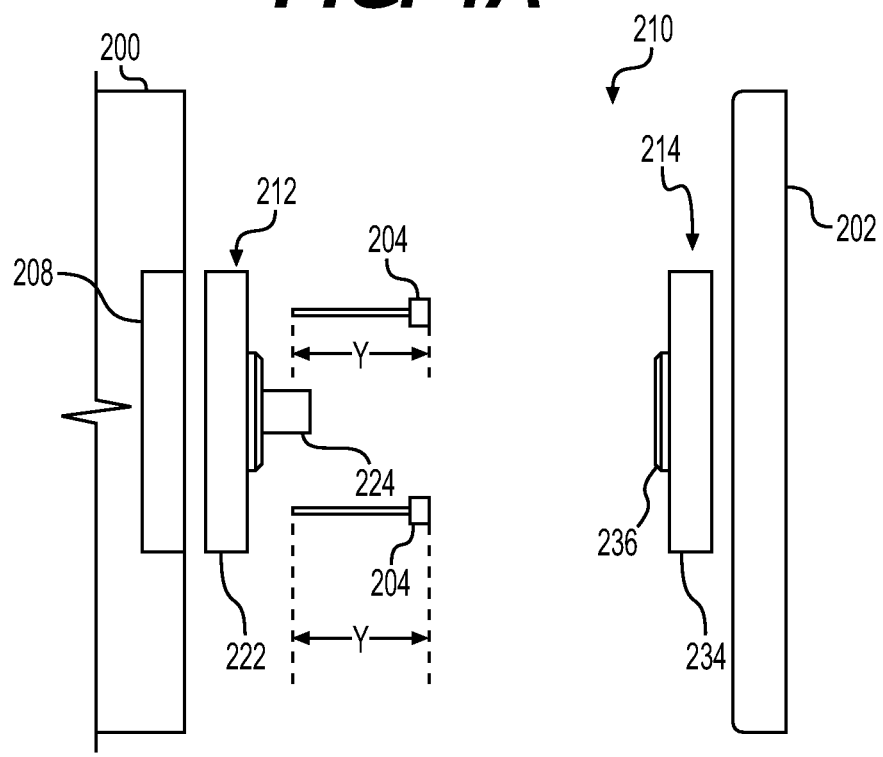
FIG. 4B is an exploded view of the fan adapter, the engine, and the fan.

FIG. 1 illustrates a perspective view of an exemplary fan adapter 10, according to the present disclosure. In one aspect, fan adapter 10 may be used to couple a fan (e.g., an engine cooling fan), a fan impeller, or one or more fan blades to a rotational drive portion of an engine (not shown). Fan adapter 10 includes a base portion or first portion 12, and a fan end portion or second portion 14. Although not shown, adapter 10 may be configured to rotationally couple a fan, for example, a cooling fan, to a drive portion of an engine, for example, to a drive pulley or to a fan drive. For example, first portion 12 may be directly coupled to the drive portion (e.g., a drive pulley) of an engine (FIGS. 4A and 4B), and second portion 14 may be directly coupled to a fan (FIGS. 4A and 4B). In one aspect, first portion 12 and second portion 14 are fixedly coupled to each other (e.g., directly coupled), and first portion 12 may be configured to be coupled to a fan drive pulley or a fan drive of the engine. The fan drive pulley or the fan drive may be belt driven, hydraulically driven, etc. In these aspects, fan adapter 10 fixedly couples a rotating or drive element of the engine to the fan such that rotation of the drive element of the engine (e.g., the fan drive pulley or fan drive) rotates fan adapter 10 and the fan, for example, to help cool the engine.

Figure 2A:
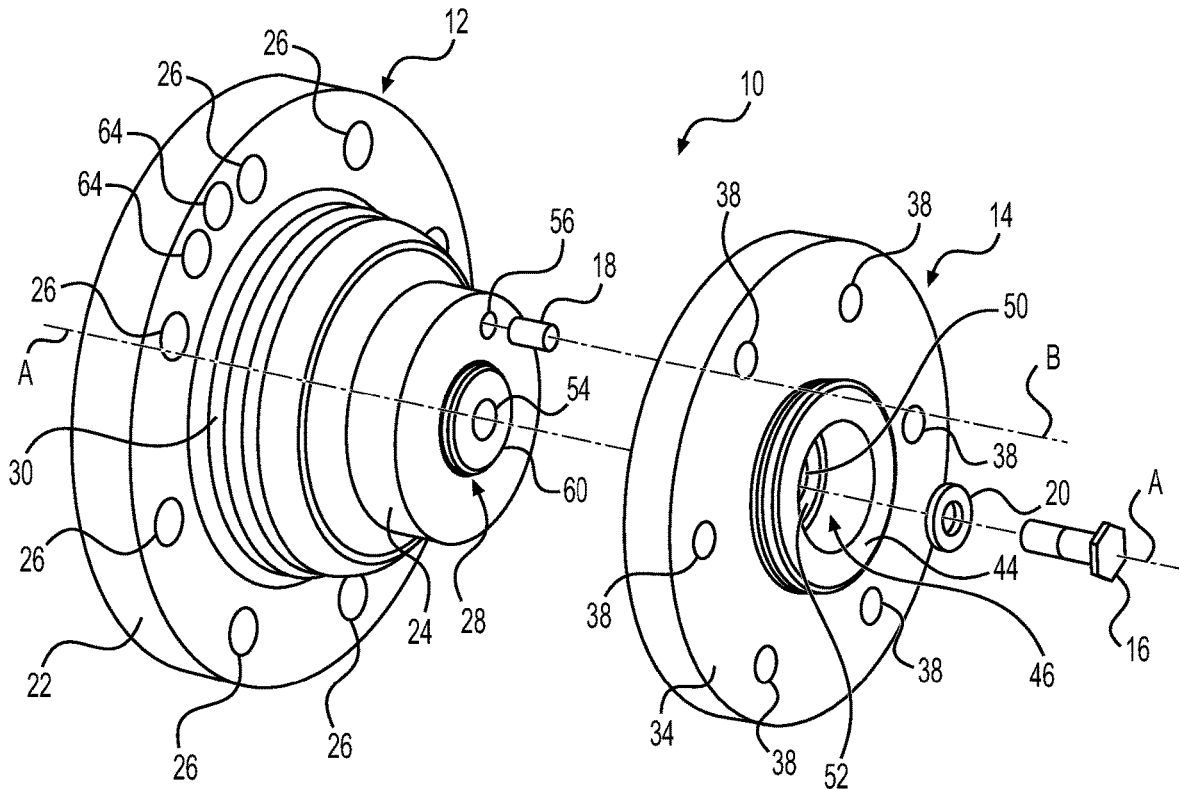
FIGS. 2A and 2B are exploded views of the fan adapter of FIG. 1.
Figure 2B:
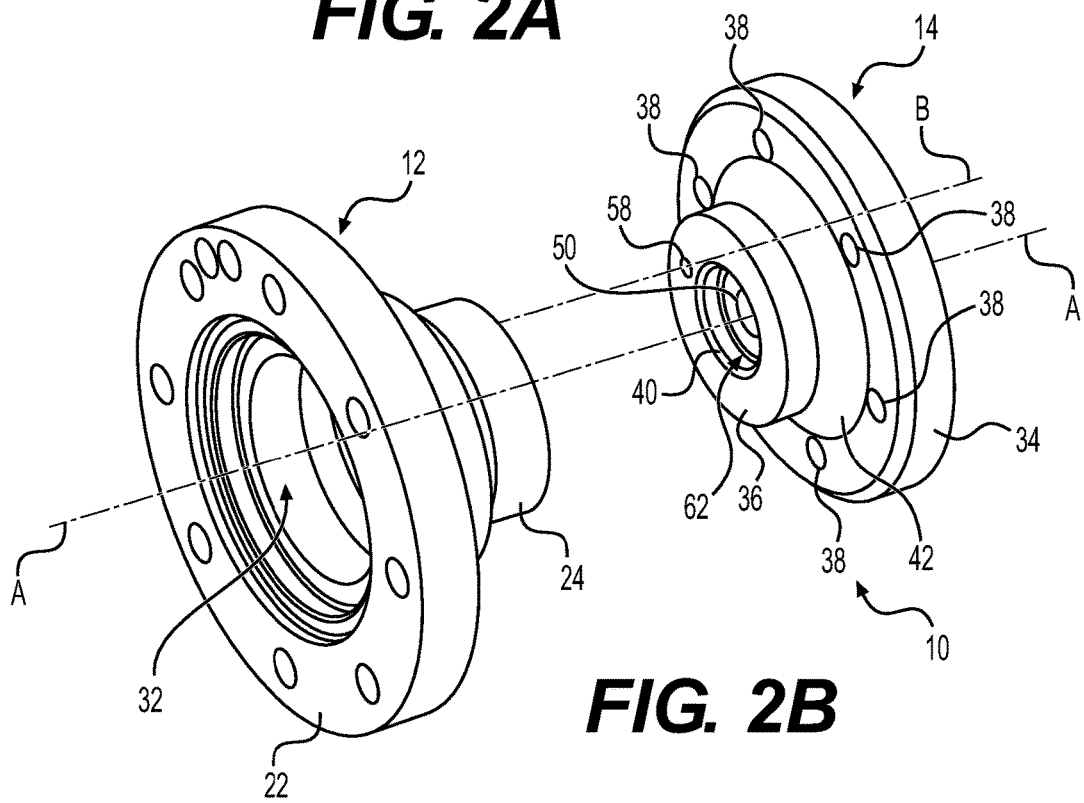

As shown in FIGS. 2A and 2B, first portion 12 and second portion 14 may be removably coupled via one or more coupling mechanisms, for example, a screw or a bolt 16. In this manner, first portion 12 may be coupled to the engine, and then second portion 14 may be coupled to first portion 12. Additionally, one or more dowel rods 18 and/or one or more washers 20 may also help couple first portion 12 and second portion 14.

First portion 12 includes a mounting portion 22 and a coupling portion 24. Mounting portion 22 may be substantially cylindrical, and may be configured to be coupled (e.g., directly coupled) to a portion of the engine (e.g., the fan drive pulley or the fan drive), for example, via one or more mounting elements (FIGS. 4A and 4B), for example, screws, bolts, etc., through a plurality of mounting holes 26. Mounting holes 26 may be circumferentially spaced around mounting portion 22, for example, evenly or unevenly. Coupling portion 24 may be a substantially cylindrical extension from mounting portion 22, for example, along axis A (FIGS. 2A and 2B) and toward second portion 14. As shown in FIGS. 2A and 2B, mounting portion 22 of first portion 12 may be larger (e.g., in diameter relative to axis A) than coupling portion 24 of first portion 12. Coupling portion 24 may also include a mating portion 28 (FIG. 2A). Mating portion 28 may be sized and/or shaped to be mated to (e.g., coupled to via an at least partially overlapping or interlocking engagement) a corresponding portion of second portion 14. Additionally, first portion 12 may include one or more graduated surfaces 30, for example, graduated annular surfaces, on coupling portion 24 between mounting portion 22 and mating portion 28. Additionally, as shown in FIG. 2B, first portion 12 may include a cavity 32, for example, in a central portion within mounting portion 22, which may help couple first portion 12 to the drive portion or element of the engine.

Second portion 14 includes a mounting portion 34 and a coupling portion 36. Mounting portion 34 may be substantially cylindrical, and may be configured to be coupled to a portion of the fan, for example, via one or more mounting elements (not shown), for example, screws, bolts, etc., through a plurality of mounting holes 38. Mounting holes 38 may be circumferentially spaced around mounting portion 22, for example, evenly or unevenly. Coupling portion 36 may be a substantially cylindrical extension from mounting portion 34, for example, along axis A (FIGS. 2A and 2B) and toward first portion 12. As shown in FIGS. 2A and 2B, mounting portion 34 of second portion 14 may be larger (e.g., in diameter relative to axis A) than coupling portion 36 of second portion 14. Coupling portion 36 may also include a mating portion 40 (FIG. 2B). Mating portion 40 may be sized and/or shaped to be mated to (e.g., directly coupled to via an at least partially overlapping or interlocking engagement) a corresponding portion (e.g., projection 60) of first portion 12. Additionally, second portion 14 may include one or more transition surfaces 42, for example, one or more slanted, curved, or angled portions on coupling portion 36 between mounting portion 34 and mating portion 40. Additionally, as shown in FIG. 2A, second portion 14 may include a mounting extension 44 and a cavity 46, for example, in a central portion within mounting portion 34, which may help couple second portion 14 to the fan.

As mentioned, first portion 12 and second portion 14 may be coupled via bolt 16, dowel rod 18, and washer 20. In this aspect, second portion 14 includes a through-hole 50, for example, extending along axis A, through a central portion of second portion 14. Through-hole 50 may be machined through the central portion of second portion 14. At least a portion of bolt 16 may be threaded. Through-hole 50 may be threaded, or may be smooth. Bolt 16, for example, with washer 20 surrounding a portion of bolt 16, may be inserted (either threaded or slid) through through-hole 50. Additionally, second portion 14 may include one or more abutment surfaces 52 to abut and/or block washer 20. As shown in FIG. 2A, a portion of bolt 16 may then be received within a hole 54 in mating portion 28 of first portion 12. Hole 54 may be at least partially threaded, and may be machined in mating portion 28, for example, along a central axis of mating portion 28 (e.g., coaxial with axis A). In this manner, tightening bolt 16 into hole 54 may help to couple second portion 14 to first portion 12.

Moreover, mating portion 28 of first portion 12 may include a dowel rod hole 56, and mating portion 40 of second portion 14 may also include a dowel rod hole 58. Dowel rod hole 56 may be a blind hole extending through a portion of first portion 12, and dowel rod hole 58 may be a blind hole extending through a portion of second portion 14. Dowel rod holes 56 and 58 may be machined and/or drilled out of respective portions of first portion 12 and second portion 14. Dowel rod holes 56 and 58 may be smooth holes, or may be at least partially threaded or roughened, which may help retain dowel rod 18 within dowel rod holes 56 and 58. Dowel rod holes 56 and 58 may be spaced away from and unaligned with central axis A, for example, along axis B. In this aspect, dowel rod hole 56 may be positioned the same distance from axis A in first portion 12 as dowel rod hole 58 is positioned in second portion 14. Dowel rod 18 may be positioned within dowel holes 56 and 58 during the coupling of first portion 12 and second portion 14. Dowel rod 18 may help to couple first portion 12 and second portion 14, for example, by helping to prevent relative rotation, which may loosen bolt 16. Dowel rod 18 may also help to protect fan adapter 10 against and/or reduce shear forces between first portion 12 and second portion 14, which otherwise may loosen bolt 16 and/or damage fan adapter 10. Although not shown, more than one bolt 16 and/or more than one dowel rod 18, and corresponding holes through portions of first portion 12 and second portion 14, may be used to couple first portion 12 and second portion 14 and help protect against relative rotation and/or reduce shear forces.

As mentioned, mating portion 28 of first portion 12 and mating portion 40 of second portion 14 may have corresponding shapes. For example, as shown in FIG. 2A, mating portion 28 may include a projection 60, for example, a circular or cylindrical projection. Projection 60 may include a one or more graduated surfaces, and/or one or more rounded or curved surfaces, which may help couple mating portion 28 of first portion 12 to mating portion 40 of second portion 14. Correspondingly, as shown in FIG. 2B, mating portion 40 of second portion 14 may include a recess 62, for example, a circular or cylindrical recess. Recess 62 may include one or more graduated surfaces, and/or one or more rounded or curved surfaces, which may help couple mating portion 28 of first portion 12 to mating portion 40 of second portion 14. In this aspect, at least a portion of projection 60 may be received within recess 62 when first portion 12 and second portion 14 are coupled together. The portion of projection 60 being received within recess 62 forms axial contact between projection 60 and recess 62, which may help stabilize and/or retain the coupling between first portion 12 and second portion 14. For example, not only are first portion 12 and second portion 14 in abutting contact (e.g., via surfaces of coupling portion 24 of first portion 12 and coupling portion 36 of second portion 14), but projection 60 extends into recess 62 in mating portion 40 to increase the surface area of the engagement between first portion 12 and second portion 14. Projection 60 extending into recess 62 may also help the user align first portion 12 and second portion 14, for example, during assembly of fan adaptor 10. One or more of projection 60 and/or recess 62 may be machined out of first portion 12 or second portion 14. It is noted that, although not shown, mating portion 28 of first portion 12 may include a recess, and mating portion 40 of second portion 14 may include a projection.

One or more of first portion 12 or second portion 14 may be formed via casting. In this aspect, one or more of first portion 12 or second portion 14 may include one or more balance holes 64 (shown in first portion 12), which may be formed via machining (e.g., drilling) after the casting in order to balance the casted element. For example, the location of balance holes 64 may be determined by dynamically balancing the casted element. In another aspect, one or more of first portion 12 or second portion 14 may be formed by machine from bar stock. For example, first portion 12 may be cast (and balanced), and second portion 14 may be machined from bar stock. Alternatively, both first portion 12 and second portion 14 may be formed via separate castings, or both first portion 12 and second portion 14 may be separately formed via machining from bar stock. One or more of first portion 12 and second portion 14 may be formed of steel, aluminum, or another appropriate material. In some aspects, different formation techniques and/or materials may be more cost effective and/or efficient. In some other aspects, different formation techniques and/or materials may be more expensive, but may yield a stronger or more durable element.

Figure 3A:
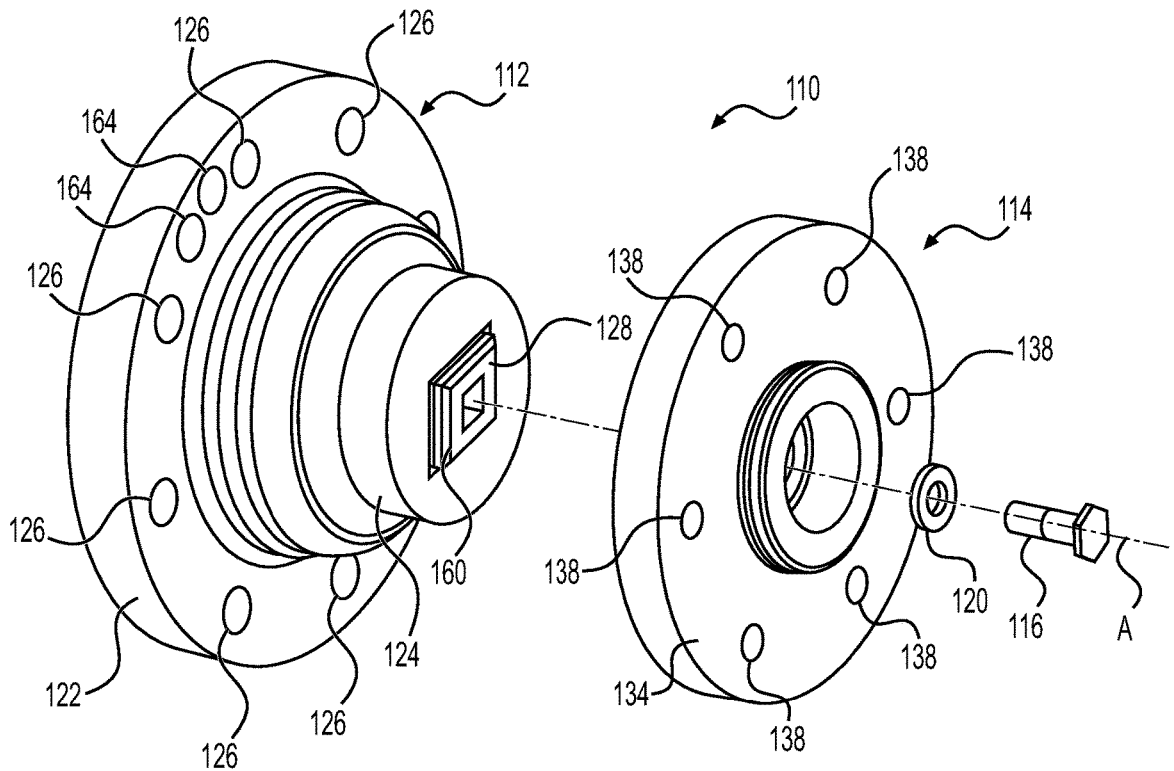
FIGS. 3A and 3B are exploded views of another exemplary fan adapter.
Figure 3B:
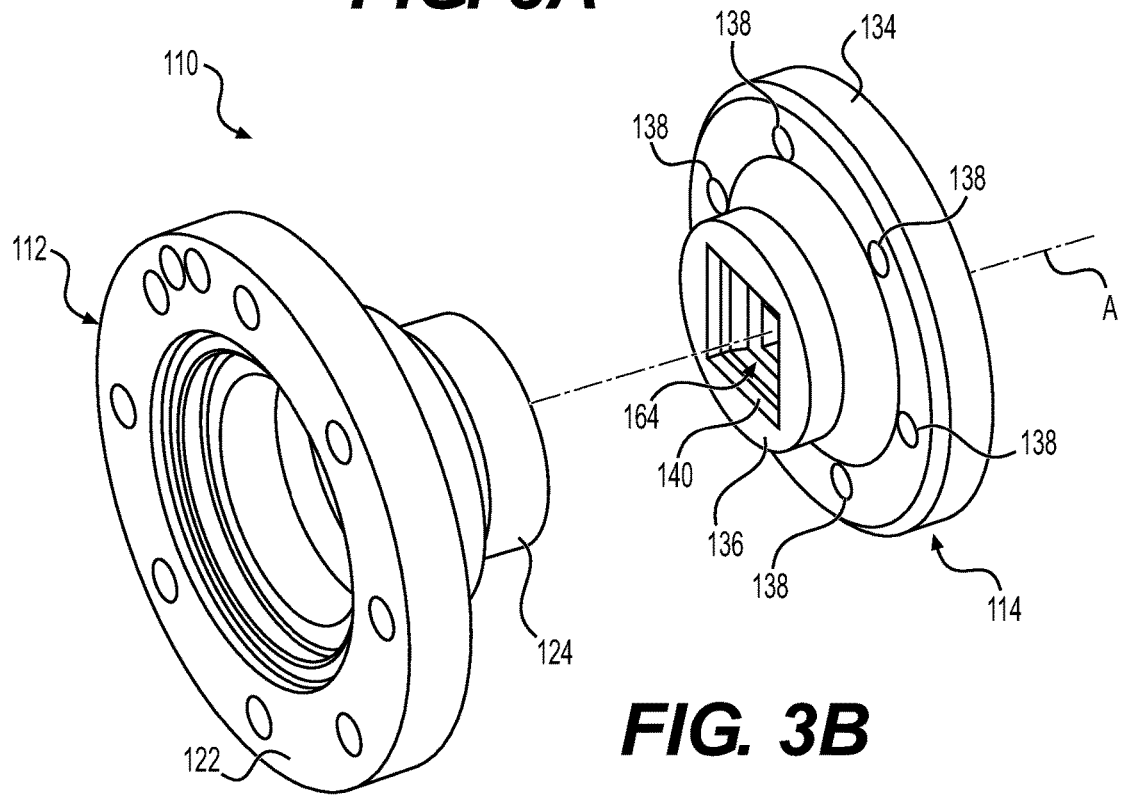

FIGS. 3A and 3B illustrate views of an alternative example of fan adapter 10 according to the present disclosure, with similar elements of fan adapter 10 shown by 100 added to the reference numbers. As shown, a fan adapter 110 includes a first portion 112 and a second portion 114. As discussed above, first portion 112 may be coupled to a portion of an engine via one or more mounting elements extending through one or more mounting hole(s) 126 in a mounting portion 122. Additionally, first portion 112 includes a coupling portion 124 with a mating portion 128, which may be coupled to a mating portion 140 of a coupling portion 136 of second portion 112, and a bolt 116 and a washer 120 may help secure first portion 112 and second portion 114, as discussed above. Moreover, as discussed above, more than one bolt 116 may be used to couple first portion 112 and second portion 114. Second portion 114 may include a mounting portion 134, which may include a plurality of mounting holes 138. Furthermore, one or more of first portion 112 or second portion 114 may include one or more balancing holes 164 (shown in first portion 112).

Moreover, in the aspect shown in FIGS. 3A and 3B, coupling portion 124 and 136 may include mating portions 128 and 140 with non-circular shapes or configurations. For example, as shown, mating portion 128 may include a projection 160 that is rectangular or square, and mating portion 140 may include a recess 162 that is rectangular or square. In this aspect, mating portions 128 and 140 may help to couple first portion 112 and second portion 114, for example, by helping to prevent relative rotation, which may loosen bolt 116. Non-circular mating portions 128 and 140 may also help to protect fan adapter 110 against shear forces between first portion 112 and second portion 114, which otherwise may loosen bolt 116 and/or damage fan adapter 110. Although not shown, fan adapter 110 may also include one or more dowel rods and dowel rod holes in coupling portions 124 and 136.

Furthermore, it is noted that mating portion 128 and mating portion 140 may include other non-circular shapes or configurations. For example, mating portions 128 and 140 may include triangular shapes, pentagonal shapes, hexagonal shapes, etc. Moreover, mating portions 128 and 140 may include trapezoidal shapes, star shapes, or irregular shapes.

FIGS. 4A and 4B illustrate views of an alternative example of a fan adapter according to the present disclosure, with similar elements of fan adapter 10 shown by 200 added to the reference numbers. As shown in FIGS. 4A and 4B, a fan adapter 210 includes a first portion 212 and a second portion 214. FIG. 4A shows a schematic view of an engine 200 and a fan 202 coupled together via fan adapter 210 (i.e., first portion 212 and second portion 214), and FIG. 4B shows a schematic view of engine 200, fan 202, and fan adapter 210 uncoupled. It is noted that FIGS. 4A and 4B are not to scale. As discussed above, first portion 212 may be directly coupled to a rotating or drive element 208 (e.g., a drive shaft, a fan drive pulley, a fan drive, etc.) of engine 200 via one or more mounting elements 204 extending through one or more mounting hole(s) (not shown) in a mounting portion 222 of first portion 212. Although not shown, drive element 208 may include one or more mounting holes that correspond to the mounting holes in mounting portion 222 of first portion 212 such that one or more mounting elements 204 may extend through one or more portions of mounting portion 222 and into one or more portions of drive element 208. Additionally, as discussed above, first portion 212 includes a coupling portion 224, which may be directly coupled to a coupling portion 236 of second portion 214, as discussed above. Although not shown in FIG. 4A or 4B, one or more bolts, washers, dowel rods, etc. may help secure first portion 212 and second portion 214, as discussed above. Second portion 214 may be directly coupled to a portion of fan 202 via one or more mounting elements 206 extending through one or more mounting hole(s) (not shown) in a mounting portion 234 of second portion 214. Although not shown, fan 202 may include one or more mounting holes that correspond to the mounting holes in mounting portion 234 of second portion 214 such that one or more mounting elements 206 may extend through one or more portions of mounting portion 234 and into one or more portions of fan 202. As mentioned above, fan adapter 210 rotationally couples drive element 208 of engine 200 to fan 202 such that rotation of drive element 208 of engine 200 (e.g., the fan drive) rotates fan adapter 210 and fan 202, for example, to help cool engine 200.

As shown in FIG. 4A, when coupled together, first portion 212 and second portion 214 may be spaced apart by a distance X. Distance X may be a distance between mounting portion 222 of first portion 212 and mounting portion 234 of second portion 214. In some embodiments discussed herein, distance X may be a standard distance between first portion 212 and second portion 214, even if different first portions 212 and second portions 214 are used to couple fan 202 to engine 200. Alternatively, distance X may vary depending on the size and/or shape of a selected first portion 212 and/or the size and/or shape of a selected second portion 214. In either aspect, as shown in FIG. 4B, one or more mounting elements 204 may include a distance, or length, Y. Distance Y may be greater than distance X. In this aspect, the one or more mounting elements 204 that couple first portion 212 to engine 200 are not limited in length and may be longer than distance X between mounting portion 222 of first portion 212 and mounting portion 234 of second portion 214 when fan adapter 210 is assembled. Accordingly, the user may use mounting elements 204 that are longer than distance X when coupling first portion 212 of fan adapter 210 to engine 200.

INDUSTRIAL APPLICABILITY

The disclosed aspects of fan adapter 10 may be used in any machine that includes an engine that includes requires cooling and/or air circulation. Fan adapter 10 described herein may provide a durable and versatile connection to couple a fan to the engine, with a limited number of components, easier and/or faster installation, and/or easier and/or faster access for maintenance or replacement. Therefore, the disclosed fan adapter 10 may be reliable and low cost, without sacrificing performance.

In one example, first portion 12 may be a predetermined size and/or shape. First portion 12 may be coupled to the engine, for example, during assembly, before shipment, after shipment, etc. For example, one or more mounting elements (e.g., one or more bolts 16) may be extended through mounting hole(s) 26 to couple first portion 12 to the engine (e.g., to a fan pulley or to a fan drive). Then, second portion 14 may be coupled to first portion 12, for example, via bolt 16, dowel rod 18, and washer 20. In this aspect, second portion 14 does not interfere with the initial mounting of first portion 12 on the engine. In the embodiments described herein, the one or more mounting elements that couple first portion 12 to the engine are not limited in length and may be longer than the distance between mounting portion 22 of first portion 12 and mounting portion 34 of second portion 14 when fan adapter 10 is assembled. In other words, as discussed above, for example, with respect to FIGS. 4A and 4B, because first portion 12 is mounted on the engine before second portion 14 is coupled to first portion 12, the final spacing between mounting portion 22 and mounting portion 34 does not limit the length of the one or more mounting elements that couple first portion 12 to the engine, or otherwise interfere with the coupling of first portion 12 to the engine. Furthermore, in some aspects, dowel rod 18 may help to couple first portion 12 and second portion 14, for example, by helping to prevent relative rotation, which may loosen bolt 16. As mentioned, dowel rod 18 may also help to protect fan adapter 10 against and/or reduce shear forces between first portion 12 and second portion 14, which otherwise may loosen bolt 16 and/or damage fan adapter 10. The non-circular mating portion configuration, as shown in FIGS. 3A and 3B and discussed above, may also help to prevent relative rotation between first portion 112 and second portion 114, while also helping to protect fan adapter 110 against and/or reduce shear forces between first portion 112 and second portion 114.

Additionally, one or more different second portions 14 may be coupled to first portion 12, for example, to couple different types, sizes, etc. of fans to the engine. In this aspect, coupling portion 24 of first portion 12 and coupling portion 36 of second portion 14 may be a standard shape and size (e.g., "commonized"), but different second portions 14 may include mounting portions 34 that are sized and/or shaped for different sizes, types, etc. of fans. For example, first portion 12 may be configured to be coupled to a variety of engines, and depending on the type and/or size of the engine, a different second portion 14 (and a different fan) may be coupled to first portion 12. In this aspect, when one second portion 14 is mounted to first portion 12, mounting portion 34 may be spaced from mounting portion 22 of first portion 12 by a first spacing. Then, when another second portion 14 is mounted to first portion 12, mounting portion 34 of the another second portion 14 may be spaced from mounting portion 22 of first portion 12 by a second spacing. Likewise, different second portions 14 may include larger or smaller mounting portions 34, and/or other different sizes, shapes, features, etc. in order for different sizes, types, etc. of fans to be coupled to second portion 14, and thus to the engine.

Moreover, because the coupling portions 24 of the different first portions 12 and the coupling portions 36 of the second portion 14 may be standard shapes and sizes, the different first portions 12 and the different second portions 14 may be coupled together, for example, to couple any type and/or size of fan to any type and/or size of engine. For example, different first portions 12 may include mounting portions 22 that are sized and/or shaped for different sizes, types, etc. of engines. Similarly, different second portions 14 may include mounting portions 34 that are sized and/or shaped for different sizes, types, etc. of fans. In some aspects, different first portions 12 and/or different second portions 14 may include similar mounting portions 22, 34, but may include different coupling portions 24 or 36 (e.g., longer longitudinal lengths). In some examples, first portion 12 may be a standard size and/or shape, for example, that is common to all or most engines, and second portions 14 may include different sizes and/or shapes for different sizes, types, etc. of fans. Furthermore, the selected first portion 12 and/or second portion 14 may not only correspond to the selected engine and/or the selected fan, but also may correspond to the desired spacing between the selected engine and the selected fan.

In one example, depending on the type and/or size of the engine, a different first portion 12 may be coupled to the engine. For example, a user may have an inventory or supply of a plurality of engines of different sizes, types, etc., and may also have an inventory or supply of a plurality of different first portions 12 of different sizes, shapes, etc. The user may select one of the plurality of engines (e.g., based on the type of machine, desired implementation, etc.), and may then select one of the plurality of different first portions 12 based on the selected engine (and/or a desired spacing between the selected engine and a fan). The selected first portion 12 may be coupled to the selected engine, as discussed herein.

Similarly, depending on the type and/or size of the fan, a different second portion 14 may be coupled to the fan and to first portion 12. For example, a user may have an inventory or supply of a plurality of fans of different sizes, types, etc., and may also have an inventory or supply of a plurality of different second portions 14 of different sizes, shapes, etc. The user may select one of the plurality of fans (e.g., based on the selected engine, desired implementation, etc.), and may then select one of the plurality of different second portions 14 based on the selected fan (and/or the desired spacing between the selected engine and the selected fan). The selected second portion 14 may be coupled to the selected fan and to the selected first portion 12, as discussed herein, for example, with coupling portion 24 of the selected first portion 12 being coupled to coupling portion 36 of the selected second portion 14. One or more of the plurality of engine, the plurality of first portions 12, the plurality of second portions 14, and/or the plurality of fans may be grouped as a kit, a system, etc. In these aspects, the commonality and interchangeability of first portion 12 and second portions 14 of fan adapter 10 may allow for different fans to be coupled to different engines, and may also help to provide for easier, simpler, and/or less time-consuming assembly of the selected fan to the selected engine.

This commonality and interchangeability may also help to provide for easier, simpler, and/or less time-consuming disassembly (e.g., by removing bolt 16 and, if applicable, dowel rod 18) in order to couple a different second portion 14, inspect, repair, and/or replace the fan, etc. Moreover, various aspects discussed herein may help to reduce material costs, as one type of first portion 12 (or different types of first portions 12) may be used with different types of second portions 14 and different types of fans.

It will be apparent to those skilled in the art that various modifications and variations can be made to the disclosed system without departing from the scope of the disclosure. Other embodiments of the system will be apparent to those skilled in the art from consideration of the specification and practice of the fan adapters disclosed herein. It is intended that the specification and examples be considered as exemplary only, with a true scope of the disclosure being indicated by the following claims and their equivalents.

What is claimed is:

1. A fan adapter, comprising:
a base, including a mounting portion and a coupling portion, wherein the base is configured to be coupled to a portion of an engine by a plurality of mounting elements; and
a fan end portion, wherein the fan end portion includes a mounting portion and a coupling portion,
wherein the coupling portion of the fan end portion is configured to be coupled to the coupling portion of the base, and wherein the fan end portion is removably couplable to the base via one or more coupling elements to prevent relative rotation between the base and the fan end portion, wherein the one or more coupling elements are different from the plurality of mounting elements, wherein the base and the fan end portion are coupled along a central axis of the fan adapter, and wherein each of the one or more coupling elements includes a linear axis, and the linear axis of each of the one or more coupling elements is generally parallel to the central axis of the fan adapter.

2. The fan adapter of claim 1, wherein the base is configured to be coupled to a fan drive pulley or a fan drive, and wherein the coupling portions of the base and the fan end portion include complementary mating portions.

3. The fan adapter of claim 2, wherein the mating portion of the base includes a male configuration, and wherein the mating portion of the fan end portion includes a female configuration.

4. The fan adapter of claim 3, wherein the mating portion of the base includes a circular male configuration, and wherein the mating portion of the fan end portion includes a circular female configuration.

5. The fan adapter of claim 3, wherein the mating portion of the base includes a non-circular male configuration, and wherein the mating portion of the fan end portion includes a non-circular female configuration.

6. The fan adapter of claim 3, wherein the one or more coupling elements includes a bolt and a dowel rod.

7. The fan adapter of claim 6, wherein a radially central portion of the fan end portion includes a through-hole configured to receive a portion of the bolt, and wherein a radially central portion of the coupling portion of the base includes a threaded blind hole configured to receive another portion of the bolt to couple the fan end portion to the base.

8. The fan adapter of claim 7, wherein the coupling portion of the fan end portion includes a blind hole configured to receive a portion of the dowel rod, and wherein the base includes another blind hole configured to receive another portion of the dowel rod.

9. The fan adapter of claim 1, wherein the mounting portion of the base is larger in diameter relative to a longitudinal axis of the fan adapter than the coupling portion of the base, and wherein the mounting portion of the fan end portion is larger in diameter relative to the longitudinal axis of the fan adapter than the coupling portion of the fan end portion.

10. A component for an engine fan adapter, comprising:
a fan end portion, wherein the fan end portion includes:
a mounting portion; and
a coupling portion that extends from the mounting portion,
wherein the coupling portion includes a mating portion configured to mate with a base portion that is coupled to an engine, and wherein the coupling portion further includes a through-hole in a central portion of the mating portion configured to receive a coupling element to couple the fan end portion to the base portion; and wherein the mating portion includes a circular recess configured to mate with a circular projection on the base portion, and wherein the coupling portion further includes a dowel rod hole configured to receive a portion of a dowel rod.

11. The component of claim 10, wherein the dowel rod hole is spaced away from the through-hole.

12. The component of claim 10, wherein the mounting portion includes a plurality of through-holes on radially outward portions of the mounting portion configured to receive mounting elements to couple the fan end portion to a fan.

13. The component of claim 12, wherein the mounting portion is larger in diameter relative to a longitudinal axis of the fan end portion than the coupling portion.

14. The component of claim 10, wherein the mounting portion is larger in diameter relative to a longitudinal axis of the fan end portion than the coupling portion.

15. A component for an engine fan adapter, comprising:
a base portion, wherein the base portion includes:
a mounting portion configured to be coupled to a fan drive pulley or a fan drive of an engine; and
a coupling portion that extends from the mounting portion,
wherein the coupling portion includes a mating portion configured to mate with a fan end portion that is coupled to or supports a fan, and wherein the coupling portion further includes a hole in a central portion of the mating portion configured to receive a coupling element to couple the fan end portion to the base portion; and wherein the mating portion includes a non-circular projection configured to mate with a non-circular recess on the fan end portion.

16. The component of claim 15, wherein the mounting portion is larger in diameter relative to a longitudinal axis of the base portion than the coupling portion.

17. The component of claim 15, wherein the mounting portion is larger in diameter relative to a longitudinal axis of the base portion than the coupling portion.

* * * * *